(12) United States Patent
Ryu

(10) Patent No.: US 7,315,339 B2
(45) Date of Patent: Jan. 1, 2008

(54) METHOD FOR MANUFACTURING LCD

(75) Inventor: Jai Il Ryu, Seoul (KR)

(73) Assignee: Boe Hydis Technology Co., Ltd., Kyoungki-do (KR)

( * ) Notice: Subject to any disclaimer, the term of this patent is extended or adjusted under 35 U.S.C. 154(b) by 392 days.

(21) Appl. No.: 11/152,514

(22) Filed: Jun. 14, 2005

(65) Prior Publication Data

US 2006/0139520 A1    Jun. 29, 2006

(30) Foreign Application Priority Data

Dec. 24, 2004    (KR) ...................... 10-2004-0111868

(51) Int. Cl.
*G02F 1/1335*    (2006.01)
(52) U.S. Cl. ...................................... 349/113
(58) Field of Classification Search ......... 349/113–114
See application file for complete search history.

(56) References Cited

U.S. PATENT DOCUMENTS 6,556,260 B1 *    4/2003    Itou et al. ..................... 349/69
7,012,365 B2 *    3/2006    Adachi et al. ............... 313/504
2004/0036817 A1 *    2/2004    Paukshto et al. ............. 349/56

FOREIGN PATENT DOCUMENTS

JP    13-356335    12/2001
JP    16-198600    7/2004

* cited by examiner

*Primary Examiner*—James A. Dudek
(74) *Attorney, Agent, or Firm*—Seyfarth Shaw LLP

(57) ABSTRACT

A method for manufacturing an LCD includes the steps of providing a transparent substrate having a thin film transistor and a protective film successively formed thereon, positioning a shadow mask having a number of openings formed thereon to expose parts on which protrusions are to be formed on top of the substrate, forming protrusions by performing a sputtering process on the substrate using the shadow mask in such a manner that sputtering radicals pass through the openings and are selectively deposited on the protective film, removing the shadow mask, and forming a reflection electrode on the substrate including the protrusions.

15 Claims, 9 Drawing Sheets

METHOD FOR MANUFACTURING LCD

BACKGROUND OF THE INVENTION

1. Field of the Invention

The present invention relates to a method for manufacturing an LCD, and more particularly to a method for manufacturing an LCD capable of improving the efficiency of protrusions of a reflection electrode in a pixel and simplifying the processes.

2. Description of the Prior Art

As is generally known in the art, LCDs may be classified into transmission-type LCDs and reflection-type LCDs according to the kind of light source. The transmission-type LCDs direct artificial light from the back light (or rear light source) fastened to the rear surface of the liquid crystal panel to the liquid crystal and adjust the amount of light depending on the arrangement of the liquid crystal to display color. The transmission-type LCDs using an artificial rear light source, however, consume too much power.

The reflection-type LCDs largely depend on external natural light or artificial light source and have less power consumption than the transmission-type LCDs. However, the reflection-type LCDs have a problem in that external light cannot be used in a dark place or in bad weather conditions.

Both reflection-type and semi-transmission-type LCDs have a reflection material film formed on the lower substrate thereof. A reflection-type LCD and a method for manufacturing the same will now be described mainly with regard to formation of a reflection material film.

Figure 1:
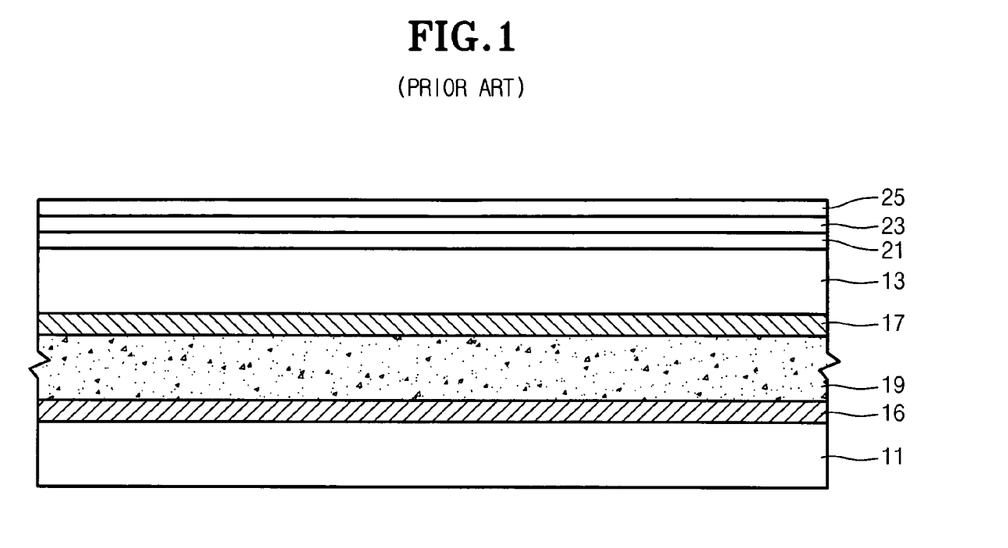
FIG. 1 is a sectional view showing a conventional reflection-type LCD.

FIG. 1 is a sectional view showing a conventional reflection-type LCD.

A conventional reflection-type LCD, as shown in FIG. 1, includes an upper substrate 13 having a color filter layer (not shown) and a common electrode 17 formed thereon, a lower substrate 11 having a thin film transistor (not shown) and a reflection electrode 16 formed thereon, and a liquid crystal 19 interposed between the upper and lower substrates 13 and 11.

The liquid crystal 19 is an optical anisotropic medium arranged in a predetermined direction by an electric field to control the flow of light. Instead of the liquid crystal 19, any medium having optical anisotropic characteristics functioning in a similar manner may be used.

The upper and lower substrates 13 and 11 have a number of optical media arranged on the outer surface thereof to artificially control the polarity condition of light. Particularly, the upper substrate 13 has a scattering film 21, a phase difference plate 23, and a polarization plate 25 successively laminated thereon. The scattering film 21 is a device for scattering light and providing the observer with wider viewing angle. The phase difference plate 23 includes a first phase difference film having the characteristics of $\lambda/4$ plate, which affects light propagating through the reflection electrode, and a second phase difference film having the characteristics of $\lambda/2$ plate, which is bonded to the first phase difference film. When no voltage is applied (i.e., in an off state), the phase difference plate 23 reverses the phase of propagating light and endows it with phase difference so that a larger amount of light is directed to the exterior and a liquid crystal having higher luminance characteristics is realized. The polarization plate 25 transmits light vibrating in the direction of the transmission axis and absorbs the remaining component.

A conventional method for manufacturing an LCD will now be described with reference to the accompanying drawings.

Figure 2:
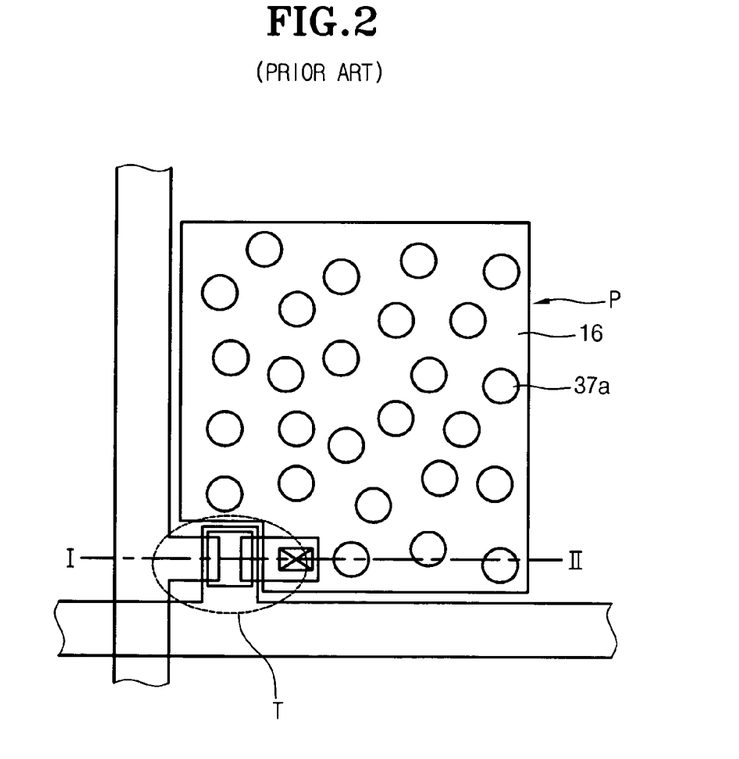
FIG. 2 is a top view showing a conventional LCD provided with a reflection electrode having protrusions formed thereon.

FIG. 2 is a top view showing a conventional LCD provided with a reflection electrode having protrusions formed thereon and FIGS. 3a to 3e are sectional views showing respective processes taken along line I-II of FIG. 2.

Figure 3A:
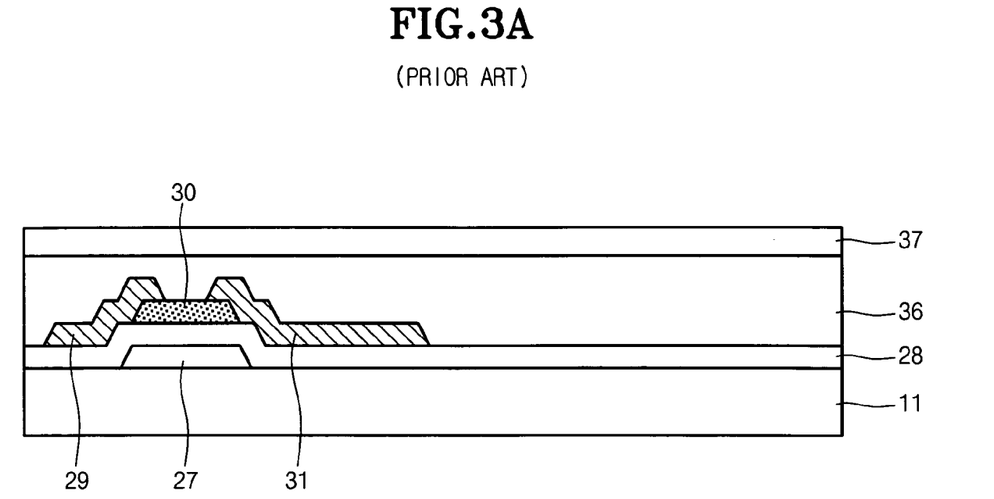
FIGS. 3a to 3e are sectional views showing respective processes taken along line I-II of FIG. 2.
Figure 3B:
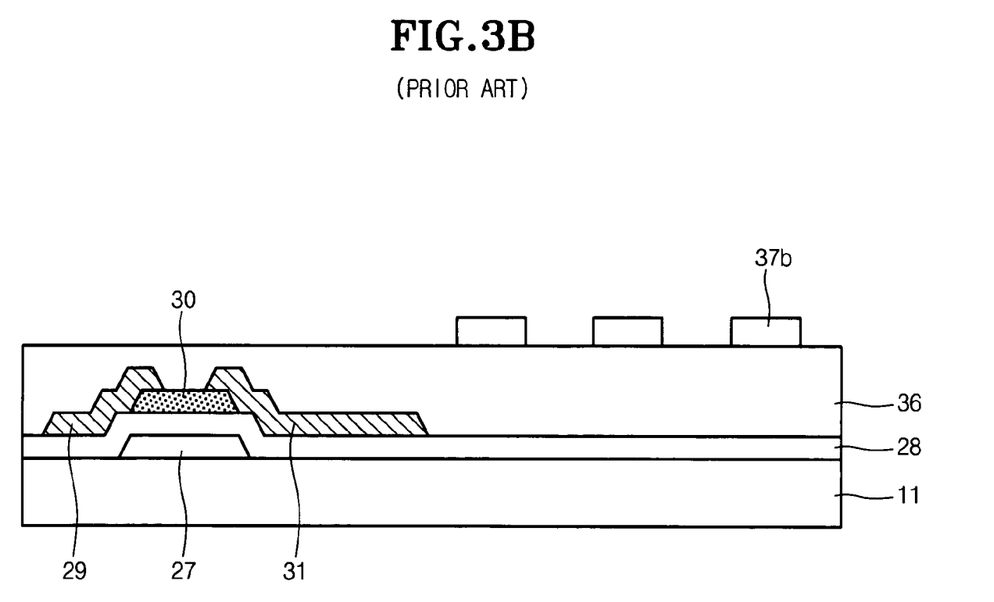
Figure 3C:
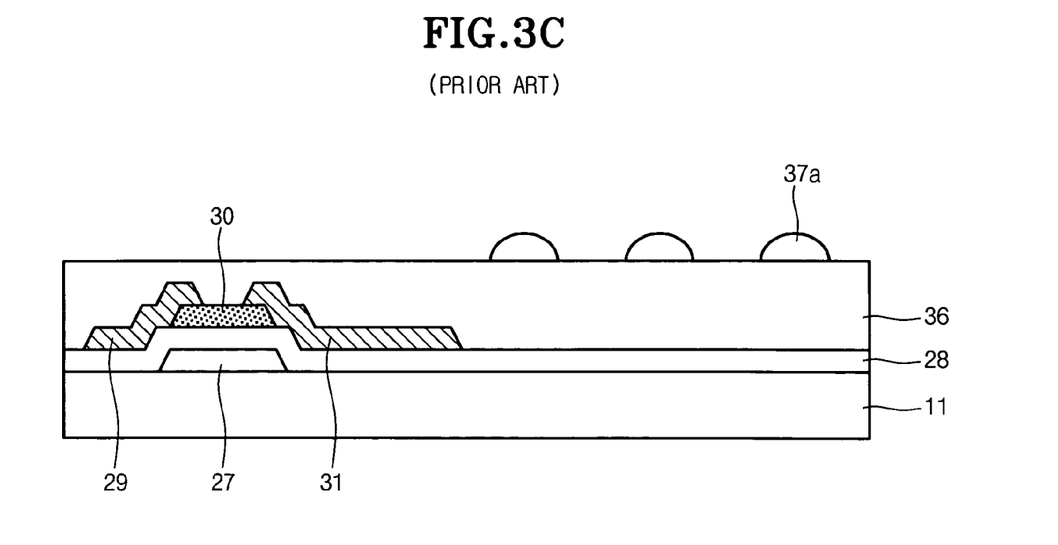
Figure 3D:
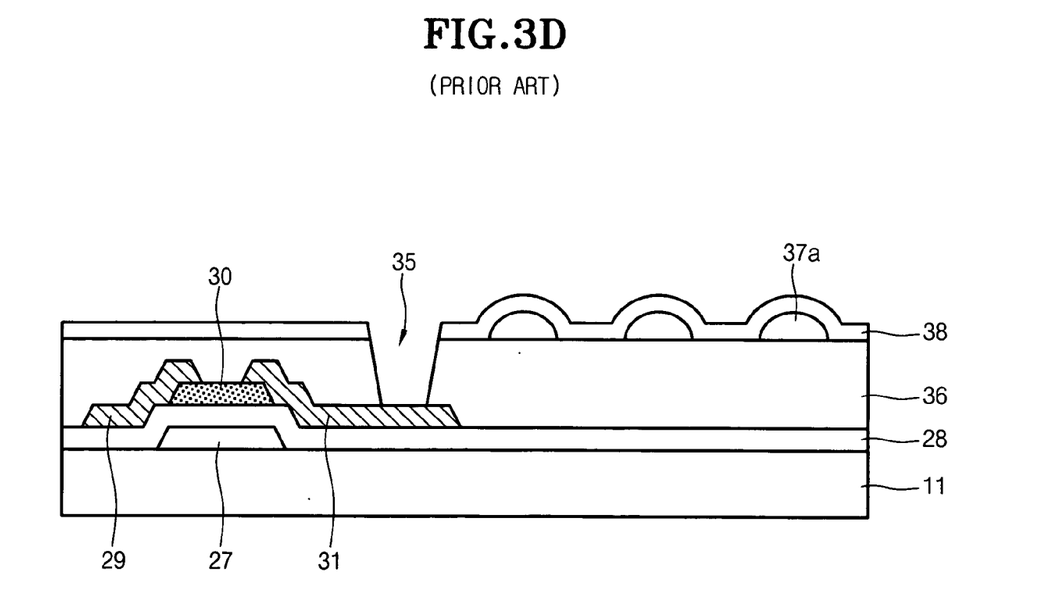
Figure 3E:
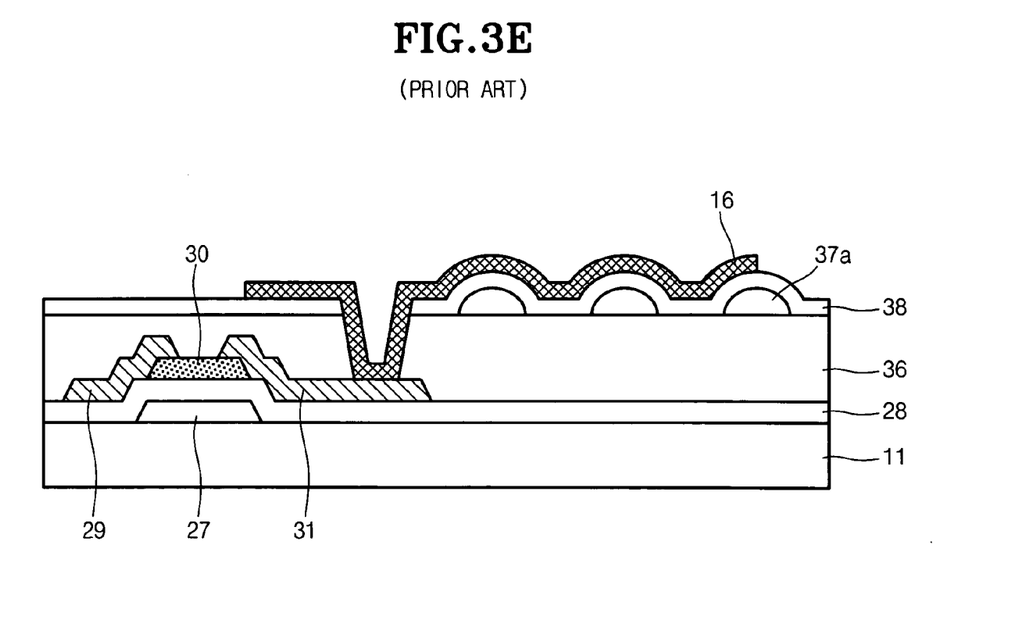

As shown in FIGS. 2 and 3e, the lower substrate 11 has a thin film transistor T formed on a predetermined part of the upper portion thereof in a conventional technology and a protective film 36 formed on a part thereof where the thin film transistor T is formed. The protective film 36 has a plurality of protrusions 37a of resin material formed thereon with a predetermined spacing. The protrusions 37a are distributed on the whole surface on which the thin film transistor T is formed with a predetermined spacing to improve the reflection angle of light.

The protective film 36 having protrusions 37a formed thereon has a reflection electrode 16 formed thereon while being electrically connected to a drain electrode 31 of the thin film transistor. The reflection electrode 16 has protrusions formed thereon by means of the protrusions 37a formed on the underlying protective film 36 so that, when external light is reflected and directed to the exterior again, light incident on the protrusions 37a at various angles are collimated and directed towards a predetermined angle.

An organic insulation film 38 is formed on the front surface of the lower substrate 11 including the protrusions 37a, and a reflection electrode 16 is formed on the organic insulation film 38.

A method for manufacturing the LCD will now be described with reference to FIGS. 3a and 3e.

As shown in FIG. 3a, a protective film 36 is formed on the front surface of the lower substrate 11 provided with a thin film transistor. A resin film 37 is then formed thereon. In FIG. 3a, reference numeral 27 refers to a gate electrode, 28 is a gate insulation film, 29 is a source electrode, 31 is a drain electrode, and 30 is a semiconductor layer.

As shown in FIG. 3b, exposure and development processes are performed to pattern the resin film and form a plurality of resin film patterns 37b with a predetermined spacing. Alternatively, underlying posts are formed and a resin film is over-coated to form the resin film patterns 37a.

As shown in FIG. 3c, the resin film patterns are subject to a reflow process by means of heat treatment to form protrusions 37a in a semispherical shape.

As shown in FIG. 3d, an organic insulation film 38 is formed on the front surface of the lower substrate 11 including the semispherical protrusions 37a. The protective film and the organic insulation film are then patterned to form a contact hole 35 so that a predetermined part of the surface of the drain electrode 31 of the thin film transistor is exposed.

As shown in FIG. 3e, a conductive opaque metal film (not shown) having excellent reflection characteristics is deposited on the front surface of the lower substrate 11 including the contact hole 35 and is patterned to form a reflection electrode 16 as a pixel electrode in the pixel region while being connected to the drain electrode 31. The reflection electrode 16 has a corrugated shape by means of the plurality of protrusions 37a.

Although desired angular distribution of protrusions may be obtained when a resin is used to form protrusions as in the prior art, it is very difficult to reduce the diameter of protrusions to 10 µm or less. Since an interval must be maintained between the protrusions having a diameter of at least 10 µm, utilization of the space inside the pixel cannot be maximized. In addition, additional photo process and heat treatment process must be performed when a resin is used. This makes the processes complicated and increases the manufacturing cost.

SUMMARY OF THE INVENTION

Accordingly, the present invention has been made to solve the above-mentioned problems occurring in the prior art, and an object of the present invention is to provide a method for manufacturing an LCD capable of improving the reflectance and viewing angle in a reflection mode by reducing the size and spacing of protrusions while maintaining a constant angular distribution of the protrusions, when a reflection electrode is formed, to increase the density of the protrusions occupying a predetermined size of pixel space.

Another object of the present invention is to provide a method for manufacturing an LCD capable of simplifying processes and reducing manufacturing cost by forming protrusions with a shadow mask to omit a photo process and a heat treatment process which are necessary to use a resin.

In order to accomplish these objects, there is provided a method for manufacturing an LCD including the steps of providing a transparent substrate having a thin film transistor and a protective film successively formed thereon, positioning a shadow mask having a number of openings formed thereon to expose parts on which protrusions are to be formed on top of the substrate, forming protrusions by performing a sputtering process on the substrate using the shadow mask in such a manner that sputtering radicals pass through the openings and are selectively deposited on the protective film, removing the shadow mask, and forming a reflection electrode on the substrate including the protrusions.

The openings are regularly or irregularly arranged on the front surface of the shadow mask. Alternatively, the openings are arranged with the same size on the front surface of the shadow mask or are mixed and arranged with various sizes on the front surface of the shadow mask.

In the sputtering process, time and degree of slant of deposition direction of sputtering radicals are adjusted to form protrusions in a desired shape.

In the step of forming protrusions, any one of the shadow mask and the substrate is rotated or vibrated in a plane to adjust the density of sputtering radicals deposited on the substrate through the openings per unit area of the substrate. The step of forming protrusions may be performed in an oblique deposition method.

The protrusions have a diameter of 10 μm or less.

The reflection electrode is made of a conductive material which is any one of aluminum and aluminum alloy.

According to another aspect of the present invention, there is provided a method for manufacturing an LCD including the steps of providing a transparent substrate having a thin film transistor and a protective film successively formed thereon, positioning a shadow mask having a number of openings formed thereon to expose parts on which protrusions are to be formed on top of the substrate, forming protrusions by performing a sputtering process on the protective film using the shadow mask, while moving any one of the shadow mask and the substrate in a plane, in such a manner that sputtering radicals pass through the openings and are selectively deposited on the protective film, removing the shadow mask, and forming a reflection electrode on the substrate including the protrusions.

According to another aspect of the present invention, there is provided a method for manufacturing an LCD including the steps of providing a transparent substrate having a thin film transistor and a protective film successively formed thereon, positioning a shadow mask having a number of openings formed thereon to expose parts on which protrusions are to be formed on top of the substrate, forming protrusions by performing a sputtering process on the substrate using the shadow mask, while vibrating any one of the shadow mask and the substrate in a plane, in such a manner that sputtering radicals pass through the openings and are selectively deposited on the protective film, removing the shadow mask, and forming a reflection electrode on the substrate including the protrusions.

According to another aspect of the present invention, there is provided a method for manufacturing an LCD including the steps of providing a transparent substrate having a thin film transistor and a protective film successively formed thereon, positioning a shadow mask having a number of openings formed thereon to expose parts on which protrusions are to be formed on top of the substrate, forming protrusions by performing an oblique deposition process on the substrate using the shadow mask in a deposition direction slanted relative to the substrate in such a manner that sputtering radicals pass through the openings and are selectively deposited on the substrate, removing the shadow mask, and forming a reflection electrode on the substrate including the protrusions.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 5:
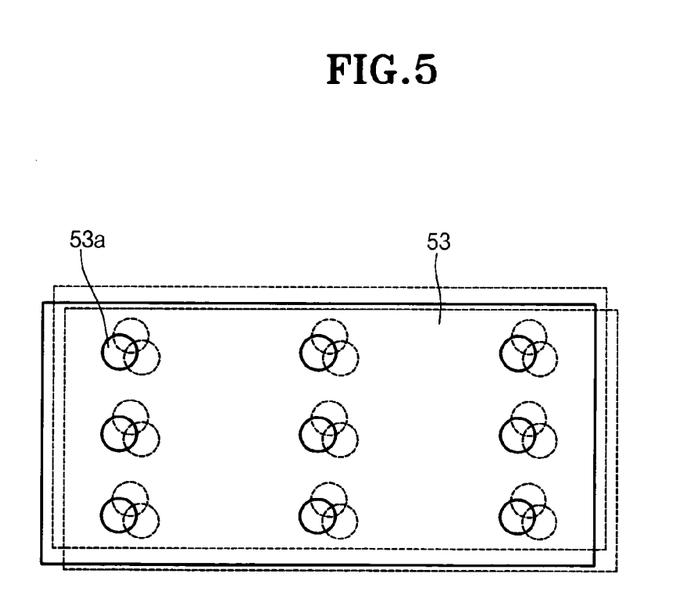
FIG. 5 is a top view showing the movement of a shadow mask.
Figure 6:
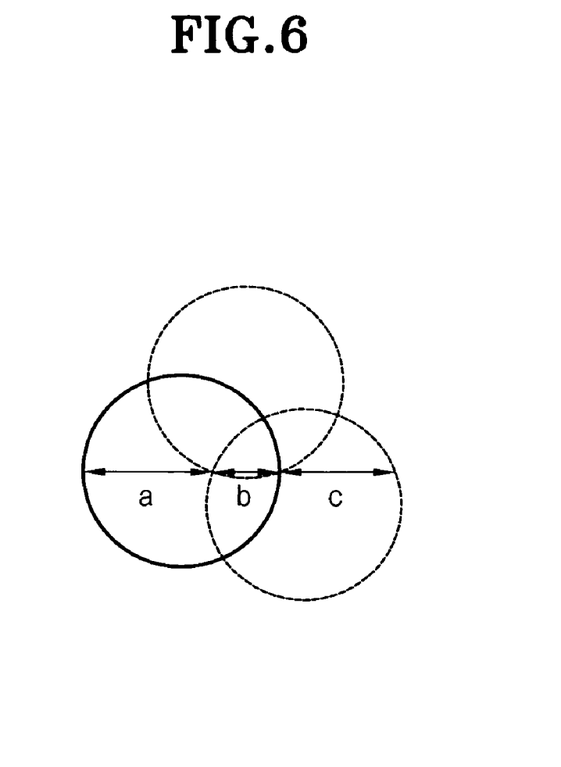
FIG. 6 is a top view showing a part of FIG. 5.
Figure 7:
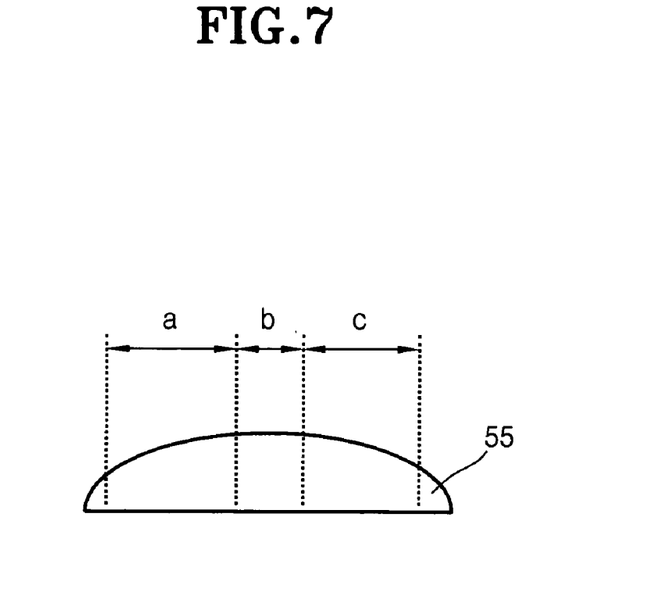
FIG. 7 is a sectional view showing the deposition of a protrusion according to the position of an opening shown in FIG. 6.

FIGS. 4a to 4d are sectional views showing processes of a method for manufacturing an LCD according to an embodiment of the present invention; FIG. 5 is a top view showing the movement of a shadow mask; FIG. 6 is a top view showing a part of FIG. 5; and FIG. 7 is a sectional view showing the deposition thickness of a protrusion according to the position of an opening shown in FIG. 6.

Figure 4A:
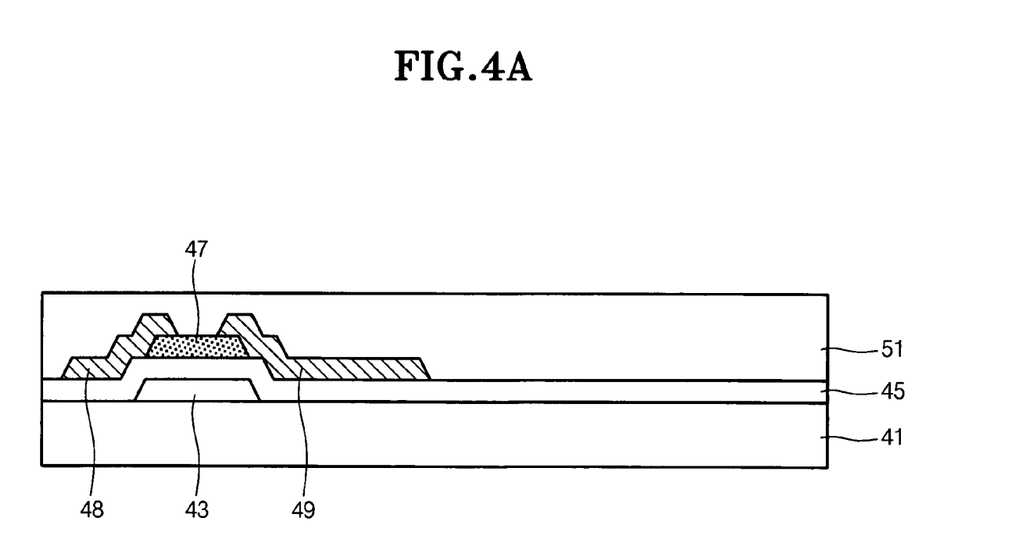
FIGS. 4a to 4d are sectional views showing processes of a method for manufacturing an LCD according to an embodiment of the present invention.

In a method for manufacturing an LCD according to the present invention, as shown in FIG. 4a, a protective film 51 is formed on the front surface of a lower substrate 41 provided with a thin film transistor. In FIG. 4a, reference numeral 43 refers to a gate electrode, 45 is a gate insulation film, 48 is a source electrode, 49 is a drain electrode, and 47 is a semiconductor layer.

Figure 4B:
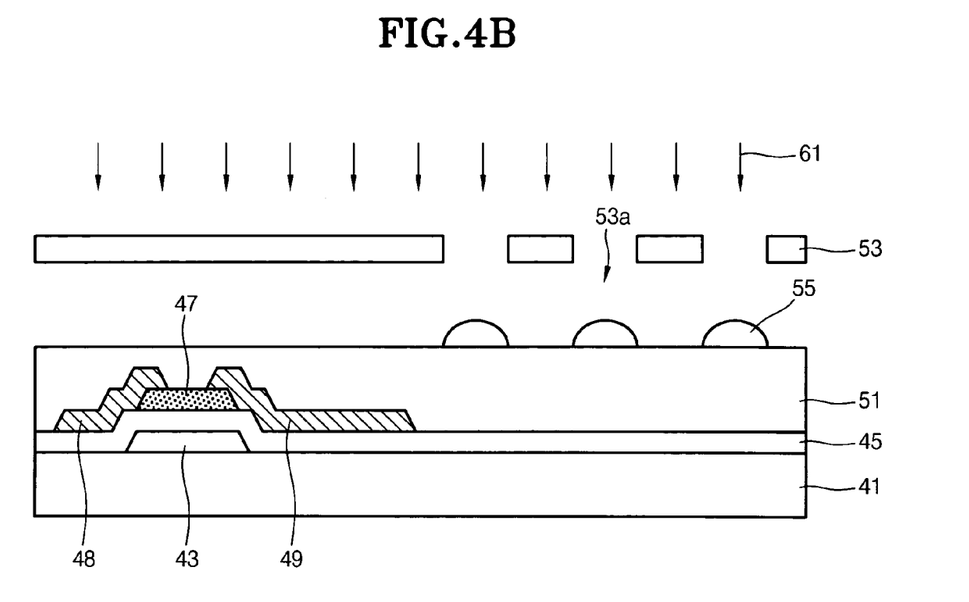
Figure 4C:
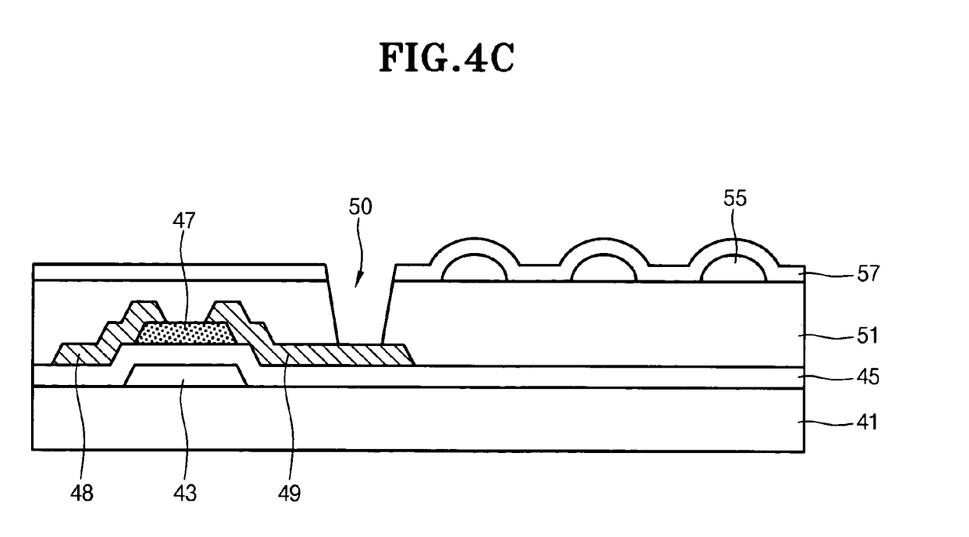

As shown in FIG. 4b, a shadow mask 53 having a number of openings 53a to expose parts on which protrusions are to be formed is positioned on top of the substrate provided with a protective film 51. The shadow mask 53 is used to perform a sputtering process 61 on the protective film 51 of the substrate while rotating any one of the shadow mask 53 and the substrate 41 in a plane to adjust the density of sputtering radicals deposited on the substrate via the openings 53a per unit area of the substrate.

Instead of rotating any one of the shadow mask 53 and the substrate 41 in a plane, any one of the shadow mask and the substrate may be vibrated in a plane to adjust the density of sputtering radicals passing through the openings.

In the sputtering process 61, as shown in FIG. 5, sputtering radicals pass through the openings 53a of the shadow mask, which is either rotated or vibrated, and are selectively deposited on the protective film 51 to form protrusions 55 in a semispherical shape. The protrusions 55 have a diameter of 10 µm or less.

As shown in FIGS. 6 and 7, a part b of a protrusion 55 overlapping an opening of the traveling shadow mask has a larger thickness than other parts a and c thereof.

After the shadow mask is removed, an organic insulation film 57 is formed on the front surface of the substrate as shown in FIG. 4. The protective film and the organic insulation film are then patterned to form a contact hole 60 so that a predetermined part of the surface of the drain electrode 49 of the thin film transistor is exposed.

Figure 4D:
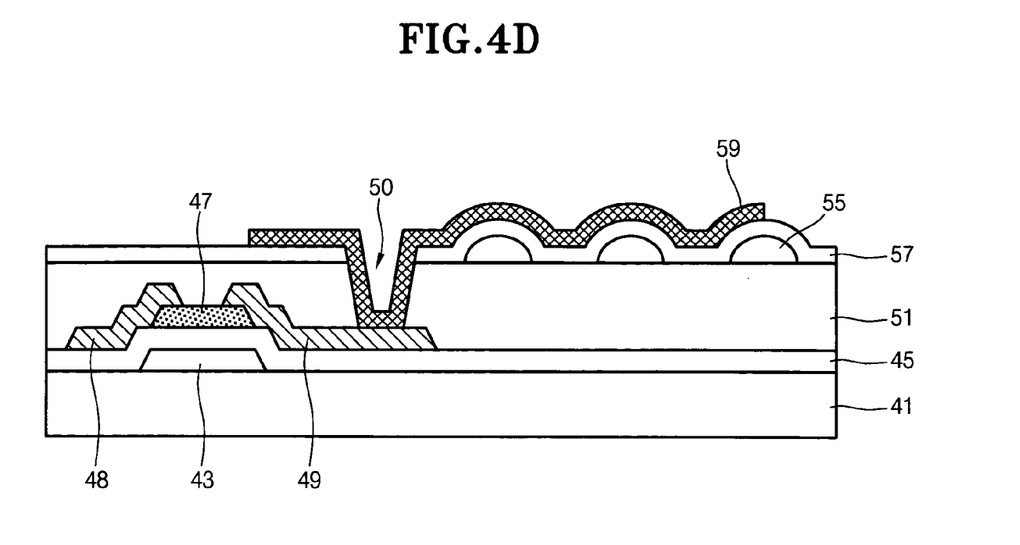

As shown in FIG. 4d, a conductive opaque metal film (not shown) having excellent reflection characteristics, such as aluminum or aluminum alloy, is deposited on the front surface of the lower substrate 11 including the contact hole 50 and is patterned to form a reflection electrode 59 as a pixel electrode in the pixel region while being connected to the drain electrode 49. The reflection electrode 59 has a corrugated shape by means of the plurality of protrusions 55.

Figure 8:
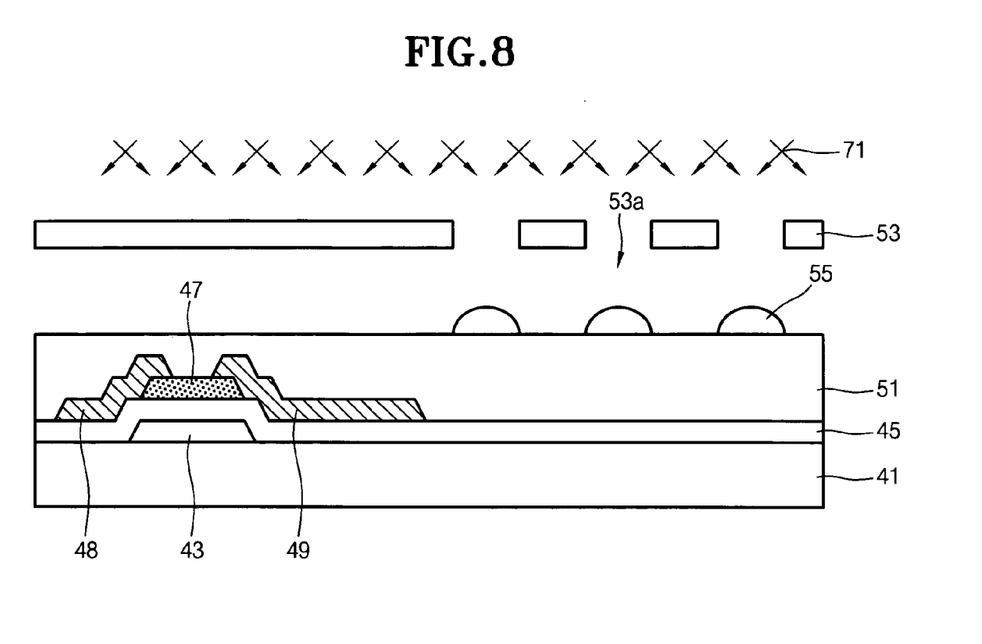
FIG. 8 is a sectional view showing processes of a method for manufacturing an LCD according to another embodiment of the present invention.

FIG. 8 is a sectional view showing processes of a method for manufacturing a reflection-type LCD according to another embodiment of the present invention.

In a method for manufacturing a reflection-type LCD according to another embodiment of the present invention, as shown in FIG. 8, a substrate 41 having transistors 43, 48, and 49 and a protective film 51 is provided. A shadow mask 53 having a number of openings 53a to expose parts on which protrusions are to be formed is positioned on top of the substrate 41. The shadow mask 53 is then used to perform an oblique deposition process on the protective film 51 of the substrate. In the oblique deposition process, an oxide (if necessary, metal or fluoride) is deposited with a slant relative to the substrate, and the deposition material is generally SiOx. The cross section and characteristics of the deposited thin film depend on the deposition material and deposition conditions including deposition angle, deposition rate, vacuum level, substrate temperature, and film thickness. In general, an obliquely deposited film is not isotropic due to the self-shadowing effect and exhibits various anisotropic physical properties including surface shape.

As a result of the oblique deposition process 71 in another embodiment of the present invention, sputtering radicals pass through the openings and are selectively deposited on the protective film 51 to form protrusions 55 of a semispherical shape. The size and shape of the protrusions 55 depend on the size, shape, and spacing of the openings of the shadow mask.

The following processes are performed in the same manner as the first embodiment of the present invention.

Figure 9:
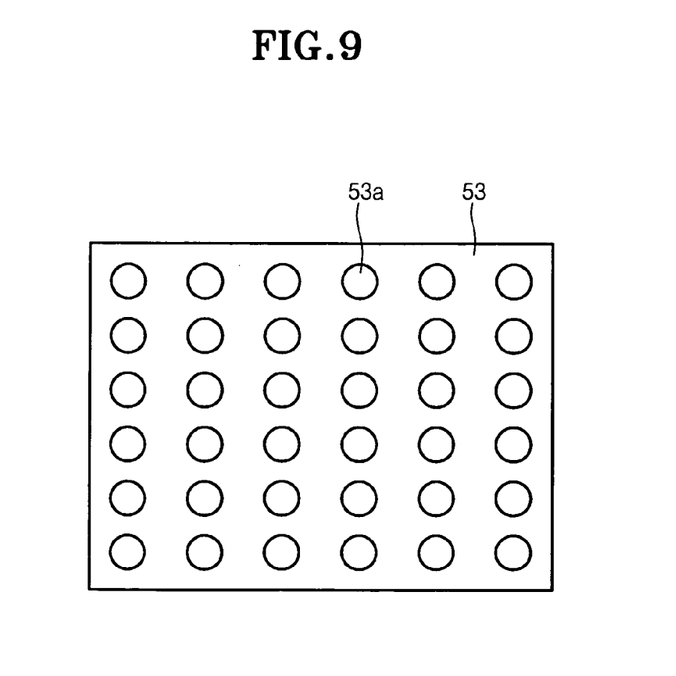
FIGS. 9 and 10 are top views showing the shape of openings of shadow masks according to the present invention.
Figure 10:
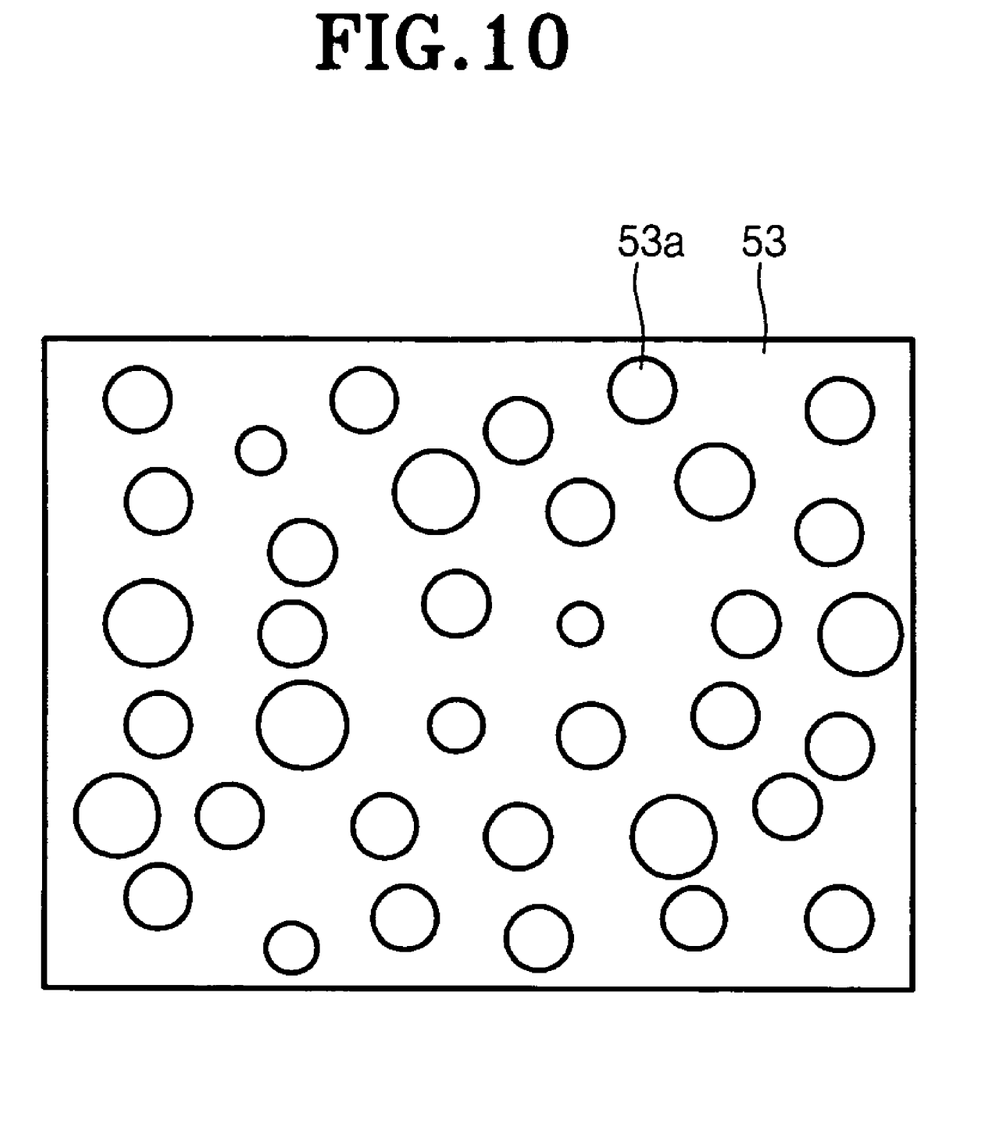

FIGS. 9 and 10 are top views showing the shape of openings of shadow masks according to the present invention.

The openings 53a may be regularly arranged with the same size on the front surface of the shadow mask 53 as shown in FIG. 9. Alternatively, the openings may be irregularly mixed and arranged with various sizes on the front surface of the shadow mask 53 as shown in FIG. 10.

The present invention uses a shadow mask to form protrusions and can maximize the utilization of space inside a pixel while obtaining desired angular distribution of the protrusions. Since a conventional resin process is omitted, processes are simplified and process cost related to resin purchase is reduced.

As mentioned above, the present invention performs a sputtering process on a substrate while moving a shadow mask or the substrate in a plane so that sputtering radicals pass through the openings of the shadow mask and are selectively deposited on the substrate to form protrusions of desired shape and size. The shape and size of the protrusions depend on the shape, size, and spacing of the openings of the shadow mask.

By using a shadow mask, the present invention can form protrusions in a smaller size than conventional protrusions formed using a resin and maximize the utilization efficiency of a reflection electrode inside a pixel. Since conventional photo process and heat treatment process necessary to use a resin are omitted, processes are simplified and manufacturing cost is reduced.

In addition, the present invention uses a shadow mask and performs an oblique deposition process while the deposition direction is slanted from the substrate to form protrusions of desired shape and size. The shape and size of the protrusions depend on the shape, size, and spacing of the openings of the shadow mask.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for manufacturing an LCD comprising the steps of:

providing a transparent substrate having a thin film transistor and a protective film successively formed thereon;

positioning a shadow mask having a number of openings formed thereon to expose parts on which protrusions are to be formed on top of the substrate;

forming protrusions by performing a sputtering process on the substrate using the shadow mask in such a manner that sputtering radicals pass through the openings and are selectively deposited on the protective film;

removing the shadow mask; and forming a reflection electrode on the substrate including the protrusions.

2. The method for manufacturing an LCD as claimed in claim 1, wherein the openings are regularly arranged on the front surface of the shadow mask.

3. The method for manufacturing an LCD as claimed in claim 1, wherein the openings are irregularly arranged on the front surface of the shadow mask.

4. The method for manufacturing an LCD as claimed in claim 1, wherein the openings are arranged with the same size on the front surface of the shadow mask.

5. The method for manufacturing an LCD as claimed in claim 1, wherein the openings are mixed and arranged with various sizes on the front surface of the shadow mask.

6. The method for manufacturing an LCD as claimed in claim 1, wherein, in the sputtering process, time and degree of slant of deposition direction of sputtering radicals are adjusted to form protrusions in a desired shape.

7. The method for manufacturing an LCD as claimed in claim 1, wherein, in the step of forming protrusions, any one of the shadow mask and the substrate is rotated in a plane to adjust the density of sputtering radicals deposited on the substrate through the openings per unit area of the substrate.

8. The method for manufacturing an LCD as claimed in claim 1, wherein, in the step of forming protrusions, any one of the shadow mask and the substrate is vibrated in a plane to adjust the density of sputtering radicals deposited on the substrate through the openings per unit area of the substrate.

9. The method for manufacturing an LCD as claimed in claim 1, wherein the protrusions have a diameter of 10 μm or less.

10. The method for manufacturing an LCD as claimed in claim 1, wherein the step of forming protrusions is performed in an oblique deposition method.

11. The method for manufacturing an LCD as claimed in claim 1, wherein the reflection electrode is made of a conductive material.

12. The method for manufacturing an LCD as claimed in claim 11, wherein the conductive material is any one of aluminum and aluminum alloy.

13. A method for manufacturing an LCD comprising the steps of:
   providing a transparent substrate having a thin film transistor and a protective film successively formed thereon;
   positioning a shadow mask having a number of openings formed thereon to expose parts on which protrusions are to be formed on top of the substrate;
   forming protrusions by performing a sputtering process on the protective film using the shadow mask, while moving any one of the shadow mask and the substrate in a plane, in such a manner that sputtering radicals pass through the openings and are selectively deposited on the protective film;
   removing the shadow mask; and
   forming a reflection electrode on the substrate including the protrusions.

14. A method for manufacturing an LCD comprising the steps of:
   providing a transparent substrate having a thin film transistor and a protective film successively formed thereon;
   positioning a shadow mask having a number of openings formed thereon to expose parts on which protrusions are to be formed on top of the substrate;
   forming protrusions by performing a sputtering process on the substrate using the shadow mask, while vibrating any one of the shadow mask and the substrate in a plane, in such a manner that sputtering radicals pass through the openings and are selectively deposited on the protective film;
   removing the shadow mask; and
   forming a reflection electrode on the substrate including the protrusions.

15. A method for manufacturing an LCD comprising the steps of:
   providing a transparent substrate having a thin film transistor and a protective film successively formed thereon;
   positioning a shadow mask having a number of openings formed thereon to expose parts on which protrusions are to be formed on top of the substrate;
   forming protrusions by performing an oblique deposition process on the substrate using the shadow mask in a deposition direction slanted relative to the substrate in such a manner that sputtering radicals pass through the openings and are selectively deposited on the substrate;
   removing the shadow mask; and
   forming a reflection electrode on the substrate including the protrusions.

* * * * *